(12) United States Patent
Gao et al.

(10) Patent No.: US 9,906,012 B2
(45) Date of Patent: Feb. 27, 2018

(54) ELECTRICAL CIRCUIT PROTECTION DEVICE FOR LEAKAGE CURRENT PROTECTION

(71) Applicant: JIAXING SHOUXIN ELECTRICAL TECHNOLOGY CO., LTD., Pingdu, Zhejiang Province (CN)

(72) Inventors: Shaohua Gao, Pingdu (CN); Qianhui Gao, Pingdu (CN)

(73) Assignee: JIAXING SHOUXIN ELECTRICAL TECHNOLOGY CO., LTD., Pinghu (CN)

( * ) Notice: Subject to any disclaimer, the term of this patent is extended or adjusted under 35 U.S.C. 154(b) by 181 days.

(21) Appl. No.: 14/986,413

(22) Filed: Dec. 31, 2015

(65) Prior Publication Data

US 2017/0093146 A1    Mar. 30, 2017

(30) Foreign Application Priority Data

Sep. 29, 2015 (CN) .......................... 2015 1 0633850

(51) Int. Cl.
*H02H 3/16* (2006.01)
*H01H 13/14* (2006.01)
(Continued)

(52) U.S. Cl.
CPC ............ *H02H 3/162* (2013.01); *H01H 13/14* (2013.01); *H01R 13/7135* (2013.01); *H01R 25/006* (2013.01); *H01R 24/78* (2013.01)

(58) Field of Classification Search
CPC ...... H02H 3/162; H02H 1/0015; H02H 3/338; H02H 3/335; H02H 3/33; H02H 5/083; H02H 11/002; H02H 3/044; H02H 3/16; H02H 3/26; H02H 3/05; H02H 3/04; H02H 3/10; H02H 3/334; H02H 7/125; H01R 13/7135; H01R 25/006; H01R 24/78; H01R 2103/00; H01R 13/652; H01R 13/7137; H01R 13/6691; H01R 24/76; H01R 13/6658; H01R 13/7032; H01R 13/713; H01H 13/14; H01H 83/04; H01H 2083/201; H01H 71/62; H01H 2083/045; H01H 71/524; H01H 83/02; H01H 83/144; H01H 2071/044; H01H 2235/01; H01H 73/14; H01H 73/44; H01H 2300/052; H01H 3/50; H01H 50/048; H01H 50/14; H01H 50/32; H01H 83/20;
(Continued)

(56) References Cited

U.S. PATENT DOCUMENTS

| 4,409,574 | A | * | 10/1983 | Misencik | ............... | H01H 83/04 335/18 |
| 2004/0201438 | A1 | * | 10/2004 | Gao | .................. | H01R 13/7135 335/6 |

(Continued)

*Primary Examiner* — Thienvu Tran
*Assistant Examiner* — Nicolas Bellido
(74) *Attorney, Agent, or Firm* — Jiwen Chen

(57) ABSTRACT

A circuit protection device includes a housing with a base and an upper cover, a clapboard, a circuit board, an AC power source path, a synchronous unit, a synchronous control switch, a tripping and resetting mechanism, a ground fault detection drive unit and a test and reset switch, to perform a function of ground fault protection, and to switch synchronously on or off the AC power path. The device has a manual mechanical tripping and electrical reset function, ensuring that the AC power supply connecting to the load circuit is switched off when the device has malfunctioned or the load circuit has failed, and preventing the device from being reset in case that the circuit protection device is not energized, or the circuit protection device has failed, or the AC power supply is reversely connected with load terminals.

10 Claims, 11 Drawing Sheets

(51) Int. Cl.
  *H01R 13/713* (2006.01)
  *H01R 25/00* (2006.01)
  *H01R 24/78* (2011.01)

(58) Field of Classification Search
  CPC ............... H01H 9/28; H01H 2071/109; H01H
      2235/018; H01H 71/0228; H01H 71/123;
      H01H 71/322; H01H 83/226; H01H
      2071/7472; H01H 2083/148; H01H
      50/54; H01H 71/002; H01H 71/04; G01R
      31/025; G01R 31/2827; G01R 31/041;
      G01R 31/024; H01C 7/126
  See application file for complete search history.

(56) References Cited

U.S. PATENT DOCUMENTS

| | | | | |
|---|---|---|---|---|
| 2004/0218316 A1* | 11/2004 | Germain | ................ | H01H 83/04 361/1 |
| 2006/0193092 A1* | 8/2006 | Huang | ................ | H01H 71/123 361/42 |
| 2006/0274463 A1* | 12/2006 | Huang | ................ | H01H 71/123 361/42 |
| 2007/0041134 A1* | 2/2007 | Huang | ................ | H01H 71/123 361/42 |
| 2007/0133136 A1* | 6/2007 | Germain | ................ | H01H 83/04 361/42 |
| 2007/0229202 A1* | 10/2007 | Gao | ................ | H01H 9/161 335/18 |
| 2009/0086389 A1* | 4/2009 | Huang | ................ | H01H 83/04 361/42 |

* cited by examiner

ELECTRICAL CIRCUIT PROTECTION DEVICE FOR LEAKAGE CURRENT PROTECTION

The present application claims the priority benefit of Chinese Application No. 201510633850.X, filed Sep. 29, 2015, which is hereby incorporated by reference.

TECHNICAL FIELD

The present invention relates to an electrical circuit protection device, and in particular, relates to a circuit protection device for leakage current protection with both load terminals and socket terminals.

BACKGROUND OF THE INVENTION

The leakage current protection device, or ground fault circuit protection device, is used to detect the ground fault current produced in electrical systems, instrument, devices, equipment and power supply systems, when the ground fault current exceeds specified limit, the circuit protection device will automatically shut down the power supply and so as to protect human being and properties. In actual application, the leakage current protection device or ground fault circuit protection device may partly or wholly malfunction, and the protection device thereby may malfunction, but users do not know that, and safe risk may occur. In actual application, for the circuit protection device with both load terminals and socket terminals, if the AC power source is input from the load terminals due to error wiring, the protection device for the socket terminals malfunctions, because the socket terminals are connected directly with the load terminals, but users do not know that, and safe risk may occur.

To solve the problems above, some circuit protection devices are designed to provide a manual test button and a manual reset button. The manual test button can test electrically whether the circuit protection device works properly, and the reset button can perform mechanical resetting for the protection device. But when the protection device fails and the protection function is lost, and the failure protection device cannot be tripped manually by the user, the AC power source connected to load terminals and socket terminals cannot be interrupted in time. On the other hand, the failure protection device can be reset by the user, and also safe risk may occur.

To solve the problems above, some circuit protection devices are provided with a circuit interrupter which can be connected respectively with load terminals and socket terminals, and the load terminals can be isolated from the socket terminals, to prevent from causing socket terminals energizing when the AC power source is input to the load terminals due to error-wiring. However, the design shall be provided with several contacts on one actuator, and that leads to imbalances of loads at different contacts. In addition, in some laboratory application, multiple sets of instruments are connected respectively to load terminals and socket terminals. If the above method of supplying power by multiple sets of contacts is adopted, when one or more contacts occurs poor contacting or disconnecting, the synchronization of power supply will be influenced, and users do not know that at this time, and the performance of power supply system is degraded.

SUMMARY OF THE INVENTION

The present invention is the extension of CN101295609B, and the contents described in patent CN101295609B will be quoted in the present patent. The technical problem to be solved by the present invention is to provide a circuit protection device with a mechanical tripping function by means of manual way. In case of failure of the circuit protection device, the mechanical tripping can be performed forcibly by means of manual way, and the AC power source connected to load terminals and socket terminals can be switched off.

The other technical problem to be solved by the present invention is to provide a circuit protection device with an electrical resetting function. The electrical resetting function includes the protection function test of the circuit protection device. The circuit protection device can be reset only when the protection function of the circuit protection device is normal, to prevent the circuit protection device at failure status is reset wrongly.

The other technical problem to be solved by the present invention is to provide a synchronous mechanism for the circuit protection device. Under correct wiring status, the load terminals and the socket terminals are connected each other. In case of AC power is reversely accessed from the load terminals, the socket terminals are not energized.

To solve the technical problems above, the technical scheme adopted in the present invention is as follows:

A circuit protection device comprises a housing comprising a base and an upper cover, in the housing, there are a clapboard, a circuit board, an AC power source path, a test and reset switch, a synchronous control switch, a tripping and resetting mechanism, a ground fault detection drive unit, and a synchronous unit.

wherein, the AC power source path comprises power terminals, load terminals, socket terminals, a main power switch, and a synchronous switch. The power terminals are used to input AC power source, and the load terminals and the socket terminals are used to connect with loads. The main power switch is used to connect or disconnect the electrical path between the power terminals and the load terminals and the socket terminals. The synchronous switch is used to connect the socket terminals with the load terminals or the power terminals.

The tripping and resetting mechanism is used to control the main power switch, the synchronous control switch and the test and reset switch to switch on or off. The tripping and resetting mechanism comprises a reset button, a reset link, a tripping button, a tripping push rod, and a raiser latch unit. The latch unit comprises a latch pin, a latch spring, a latch armature, and a tripping coil. The latch pin, the reset link and the raiser form an interlocking mechanism. By changing positions between the latch pin, the reset link and the raiser, the raiser can move up and down, so that the main power switch, the synchronous control switch and the test and reset switch can be controlled. By pressing manually the reset button to move the reset link downwards, the positions of the reset link, the latch pin and the raiser can be changed. By pressing manually the tripping button to move the tripping push rod downwards, push the latch pin to move to right, the positions of the latch pin and the raiser can be changed.

The ground fault detection drive unit is used to detect ground fault current in the AC power supply path. When the ground fault current exceeds the preset current value, the ground fault detection drive unit switches on the exciting circuit of the tripping coil, the tripping coil is energized with the exciting current, and the latch pin moves to right, and the relative positions between the latch pin, the reset link and the raiser are changed.

The test and reset switch is used for testing ground fault protection function of the circuit protection device, when the test and reset switch is closed, a ground fault current is generated in the AC power source path, and the ground fault detection drive circuit outputs a tripping signal;

The clapboard is fixed between the base and the upper cover, and used for fixing the socket terminals, and positioning the main power switch and the raiser;

The circuit board is fixed on the base, and used for fixing the test and reset switch, the synchronous control switch and the latch unit.

The synchronous unit is fixed on the latch unit, and used for pulling the synchronous switch to act. The synchronous unit comprises a synchronous coil. The synchronous switch has two operating positions: a normal closed position and a normal open position. When the synchronous switch is at the normal closed position, the socket terminals are connected with the load terminals. When the synchronous switch is at the normal open position, the socket terminals are connected with the power terminals.

The synchronous control switch is used to switch on or off the exciting circuit of the synchronous coil, and control the synchronous unit. When the synchronous control switch is switched on, the synchronous unit is snapped, so that the synchronous switch can be changed from the normal closed position to the normal open position. When the synchronous control switch is switched off, the synchronous switch can be changed back to the normal closed position.

Further, the test and reset switch further comprises a test movable contact blade and a test static contact blade for testing, and the synchronous control switch comprises a synchronous control movable contact blade and a synchronous control static contact blade for synchronous controlling. The main power switch comprises a pair of power movable contact blades, a pair of load static contact blades, and a pair of socket static contact blades. The power movable contact blades are installed at the upper surface of the raiser, the load static contact blades and the socket static contact blades are located at the lower surface of the clapboard, the power movable contact blades are connected with the power terminals, the load static contact blades are fixed at the load terminals, and the socket static contact blades are fixed on the socket terminals. The raiser comprises a test bump and a synchronous lifting arm, the test bump is located over the test movable contact blade, and the synchronous lifting arm is located underneath the synchronous control movable contact blade. The raiser moves in vertical direction and makes the main power switch, the test and reset switch and the synchronous control switch to switch on or off, the raiser moves in a vertical direction, and passes through a reset position, a tripping position and a test position from top to bottom. When the raiser is located at the reset position, the main power switch is switched on, and when the raiser leaves away from the reset position, the main power switch is switched off. When the raiser is located at the test position, the test and reset switch is switched on, and when the raiser leaves away from the test position, the test and reset switch is switched off. When the raiser is located at the test position or the tripping position, or between the test position and the tripping position, the synchronous control switch is switched on, and when the raiser leaves away from the tripping position and moves towards the reset position, the synchronous control switch is switched off before the raiser arrives at the reset position.

The raiser disclosed by the present invention is added with a synchronous lifting arm. When the raiser moves up and down, it can make the synchronous control switch be switched on or off by means of moving the synchronous lifting arm.

The latch pin further comprises a latch pin slant plate, a latch hole and a latch pin hook, the latch pin moves in horizontal direction and passes through the raiser, the latch pin slant plate protrude from the left wall of the raiser, the latch hole is located in the raiser, the latch pin hook is located at the right side of the raiser, and the latch pin can move left and right in a horizontal direction, and move up and down in a vertical direction together with the raiser.

The reset link further comprises a upper arm, a reset hook and a lower arm, the reset link can move up and down in a vertical direction, and can also swing left and right around the joint of the reset link and the reset button, the reset link is inserted into the raiser in a vertical direction, and then inserted into the latch hole. There are three interlocking positions among the latch pin, the raiser and the reset link: one is a lower-locking position, the latch pin pushes the lower arm of the reset link to left, and prevents the reset link from moving down in a vertical direction. The second is an upper-locking position, the latch pin pushes the upper arm of the reset link to left, and makes the reset hook swing to left and hook at the bottom of the raiser, and the raiser prevents the reset link from moving upwards. The third is an unlocking position, the latch pin moves to right, and detaches the reset link from the latch pin and the raiser.

By controlling the relative positions among the latch pin, the reset link and the raiser, the relative movement relationship between the raiser and the reset link can be determined, so that the movement of the raiser can be controlled and the reset, tripping or synchronous control function of the circuit protection device can be realized. The raiser can move up and down in a vertical direction under the action of the reset link, the tripping spring, and the movable contact blade of the test and reset switch. The latch pin moves in a horizontal direction and passes through the raiser, the latch pin slant plate at the left of the latch pin protrude from the left wall of the raiser, the latch hole at the middle of the latch pin is located in the raiser, the latch pin hook at the right of the latch pin is located at the right side of the raiser, and the latch pin can move left and right in a horizontal direction under the action of the magnetic force generated by the tripping coil and the elastic force of the latch spring, and move in a vertical direction together with the raiser. The reset link passes a reset spring from up to down in a vertical direction, and then passes through the clapboard, and a tripping spring, and insert into the raiser, and finally insert into the latch hole of the latch pin. The upper end of the reset spring is pressed onto the bottom of the reset button, the lower end of the reset spring is pressed on the clapboard, the upper end of the tripping spring is pressed on the bottom of the clapboard, and the lower end of the tripping spring is pressed on the raiser. The reset link can move up and down in a vertical direction, and can also swing left and right around the joint of the reset button and the reset link. The reset spring can make the reset link move upwards, and the reset link can move downwards by pressing downwards the reset button manually. The latch pin moves left and right, and pushes and pulls the reset link to swing right and left.

The raiser moves from up to down in a vertical direction, and passes through the reset position, the tripping position and the test position. When the latch pin moves to the right, it becomes unlocking, and the reset link detaches from the raiser and the latch pin. The raiser returns back to the tripping position under the action of elastic force of the tripping spring or the movable contact blade of the test and reset switch. When the latch pin moves to the left, there are two locking positions according to the relative positions between the reset link and the latch pin: a lower-locking position and an upper-locking position. The lower-locking position: when the reset hook is located above the latch pin, the latch pin pushes the lower arm of the reset link to the left, and prevents the reset link from moving down in a vertical direction. At his time, by pressing manually the reset button to push the reset link downwards, it makes the raiser move downwards together with the reset link until the raiser arrives at the test position. The upper-locking position: when the reset hook is located below the latch pin, the latch pin pushes the upper arm of the reset link to the left, and makes the reset link swing to left, the reset hook hooks at the bottom of the raiser, and the raiser prevents the reset link from moving upwards. Under the action of the elastic force of the reset spring, the reset link pulls the raiser upwards, until the raiser arrives at the reset position. During the above period, when the raiser is located at the reset position, the main power switch is switched on. When the raiser leaves away from the reset position, the main power switch is switched off. When the raiser is located at the test position, the test and reset switch is switched on. When the raiser leaves away from the test position, the test and reset switch is switched off. When the raiser is located at the test position or the tripping position, or between the test position and the tripping position, the synchronous control switch is switched on. When the raiser leaves away from the tripping position and moves towards the reset position, the synchronous control switch is switched off before the raiser arrives at the reset position.

The circuit protection device disclosed by the present invention is reset electrically, and during the reset process, the protection function test of the circuit protection device is performed. During the process, the raiser moves down from the tripping position to the test position, then from the test position to the tripping position, and then from the tripping position to the reset position. The reset process is as follows: at the tripping position, the latch pin is located at the lower-locking position, and prevents the reset link from moving down in a vertical direction, the raiser moves down to the test position by pushing the reset link downwards, and the test bump at the lower of the raiser pushes the movable contact blade and the static contact blade of the test and reset switch to close, and makes the test and reset switch be switched on, and initiates the protection function test of the circuit protection device. At this time, when the protection function of the circuit protection device is normal, the tripping coil is energized with sufficient exciting current. Under the action of the magnetic force generated by the tripping coil, the latch armature moves to the right and pulls the latch pin to the right, until the latch pin, the reset link and the raiser are in the unlocking position, so that the reset link detaches from the raiser. The raiser moves up to the tripping position under the action of elastic force of the movable contact blade of the test and reset switch, then the test and reset switch is switched off, and the exciting current in the tripping coil goes away. Under the action of elastic force of the latch spring, the latch armature moves to the left and pushes the latch pin to the left, and the latch pin pushes the upper arm of the reset link to the left, and the reset hook hooks at the bottom of the raiser, i.e. the upper-locking position. Under the action of elastic force of the reset spring, the raiser is pulled to the reset position by the reset link, so that the main power switch is switched on, and the reset process is finished. During the process above, the circuit protection device must be connected with AC power source, and the circuit protection device must be operated normally, then the circuit protection device can be reset successfully. Otherwise, when the circuit protection device is not energized or failure, or AC power supply is reversely input from the load terminals, the circuit protection device cannot be reset.

The circuit protection device disclosed by the present invention is tripped manually by means of a mechanical system. The lower part of the tripping push rod is a tripping ramp. When the tripping ramp is pushed downwards by pushing manually the tripping button downwards, the slant surface of the tripping ramp and the slant surface of the latch pin slant plate contact with each other, and slide relatively. The tripping ramp pushes the latch pin to move to the right, and the mechanical tripping is realized to switch off AC power source to the load terminals and the socket terminals. The circuit protection device can ensure that the mechanical tripping can be performed forcibly by means of manual way in case of power failure or even if the circuit protection device is failed. The process is as follows: when the circuit protection device is at the reset status, the raiser is at the reset position, the latch pin and the reset link is at the upper-locking position, the slanting surface of the latch pin slant plate is close to the slanting surface of the tripping ramp. When the tripping ramp is pushed downwards by pushing manually the tripping button downwards, the slant surface of the tripping ramp and the slant surface of the latch pin slant plate contact with each other, and slide relatively. The tripping ramp pushes the latch pin to move to the right, unlocks the latch pin, and detaches the raiser from the reset link, the raiser comes back to the tripping position under the action of the tripping spring, and the mechanical tripping of the circuit protection device is realized. The process above is a pure mechanical process, so the circuit protection device can be tripped forcibly in case of the circuit protection device is not energized or even if the circuit protection device has failed.

Further, the synchronous unit comprises a synchronous armature, a synchronous pushing plate, a synchronous spring and a synchronous coil. The synchronous switch comprises a pair of synchronous movable contact blades, a pair of synchronous normal closed static contact blades and a pair of synchronous normal open static contact blades. The synchronous movable contact blades are fixed on the synchronous pushing plate. The synchronous normal closed static contact blades and synchronous normal open static contact blades are fixed on the housing of the synchronous unit. The synchronous movable contact blades are located between the synchronous normal closed static contact blades and the synchronous normal open static contact blades.

The synchronous control switch is used to switch on or off the exciting circuit of the synchronous coil, and makes the synchronous unit to act, so that the synchronous switch can be changeover between a normal open position and a normal closed position. When the synchronous coil is not energized, the synchronous switch is at the normal closed position. When the synchronous coil is energized with sufficient exciting current, the synchronous switch is switched to the normal open position from the normal closed position. Specifically, the exciting circuit of the synchronous coil is connected to the load terminals, and the synchronous control switch is connected to the exciting circuit in series. When the synchronous control switch is switched off, the synchronous coil fails to work, the synchronous switch is at the normal closed position, the synchronous movable contact blades and the synchronous normal closed static contact blades are closed. When the synchronous control switch is switched on and the load terminals are connected with AC power source, the synchronous coil is energized with sufficient exciting current, the synchronous unit is snapped. The synchronous switch is switched to the normal open position from the normal closed position, and the synchronous movable contact blades and the synchronous normal open static contact blades are closed.

Further, the synchronous movable contact blades are further connected with the socket terminals, the synchronous normal closed static contact blades are connected with the load terminals, and the synchronous normal open static contact blades are connected with power terminals. When the synchronous switch is at normal closed position, the synchronous movable contact blades and the synchronous normal closed static contact blades are closed, the socket terminals and the load terminals become a pair of conductors, and the power terminals are the other pair of conductors. When the synchronous switch is at normal open position, the synchronous movable contact blades and the synchronous normal open static contact blades are closed, the socket terminals and the power terminals become a pair of conductors, and the load terminals are the other pair of conductors.

Further, the exciting circuit of the synchronous coil is further connected with the load terminals. When AC power supply is reversely connected with the load terminals, the synchronous switch is changed to the normal open position, and the electrical paths to load terminals and socket terminals are interrupted, and ensure the socket terminals are not energized. When AC power supply is normally wired and connected with the power terminals, the synchronous switch is at the normal closed position under tripping condition. During the reset process, when the circuit protection device is changed to the reset position from the tripping position, the raiser moves upwards from the tripping position, the synchronous control switch is switched off by the synchronous lifting arm before the raiser arrives at the reset position, so the synchronous switch is kept at the normal closed position and the load terminals and the socket terminals are connected synchronously connected with the power terminals.

The beneficial results of the present invention is to perform mechanical tripping and electrical reset by the circuit protection device by means of manual way, and the circuit protection device can be tripped forcibly in the mechanical method in case of it is failure or not energized. In case of the circuit protection device is not energized or the circuit protection device has failed, or the AC power supply is reversely connected with the load terminals, it can ensure that the circuit protection device cannot be reset, and so the safe protection capacity of the circuit protection device can be improved. As the synchronous switch realizes the synchronous power supply for load terminals and socket terminals, the current loading capacity and reliability of the circuit protection device is improved.

EMBODIMENTS OF THE PRESENT INVENTION

The following is a detailed description for the present invention according to the attached drawings and embodiment, and the following embodiment is not limited to the present invention.

Figure 1:
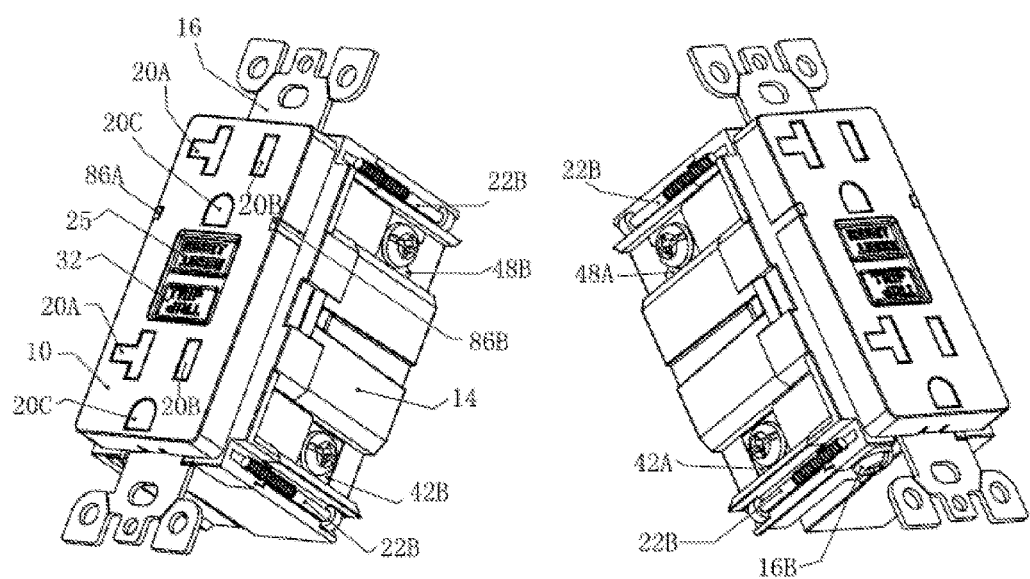
FIG. 1 shows the outside diagram according to an embodiment of the present invention.

FIG. 1 shows the outside diagram according to an embodiment of the present invention. It discloses a circuit protection device, which has a housing. The housing comprises a base 14 and an upper cover 10 on which is equipped a set of socket terminals 20 (including three pins 20A, 20B and 20C), a reset button 25 and a tripping button 32. A pair of power terminals 42 (including two pins 42A and 42B) are fixed on the left rear and left front of the base 14, and a pair of load terminals 48 (including two pins 48A and 48B) are fixed on the right rear and right front of the base 14. A grounding piece 16 is fixed between the upper cover 10 and the base 14, the grounding piece 16 is provided with a grounding screw 16B which is used for connecting with a grounding protection conductor. The pin 20C of socket terminals 20 is connected with the grounding piece 16. The pins 20A and 20B of the socket terminals 20 are used to connect with a phase line and a neutral line of loads. The pins 42A and 42B of the power terminals 42 are used to connect with the phase line and neutral line of AC power supply. The pins 48A and 48B of the load terminals 48 are used to connect with phase line and neutral line of loads. Two indictor lamp window 86A and 86B are provided on the upper cover 10 and used to indicate the circuit status. The four screws 22B are set at the four corners of the base 14 and used to fix the circuit protection device.

Figure 2:
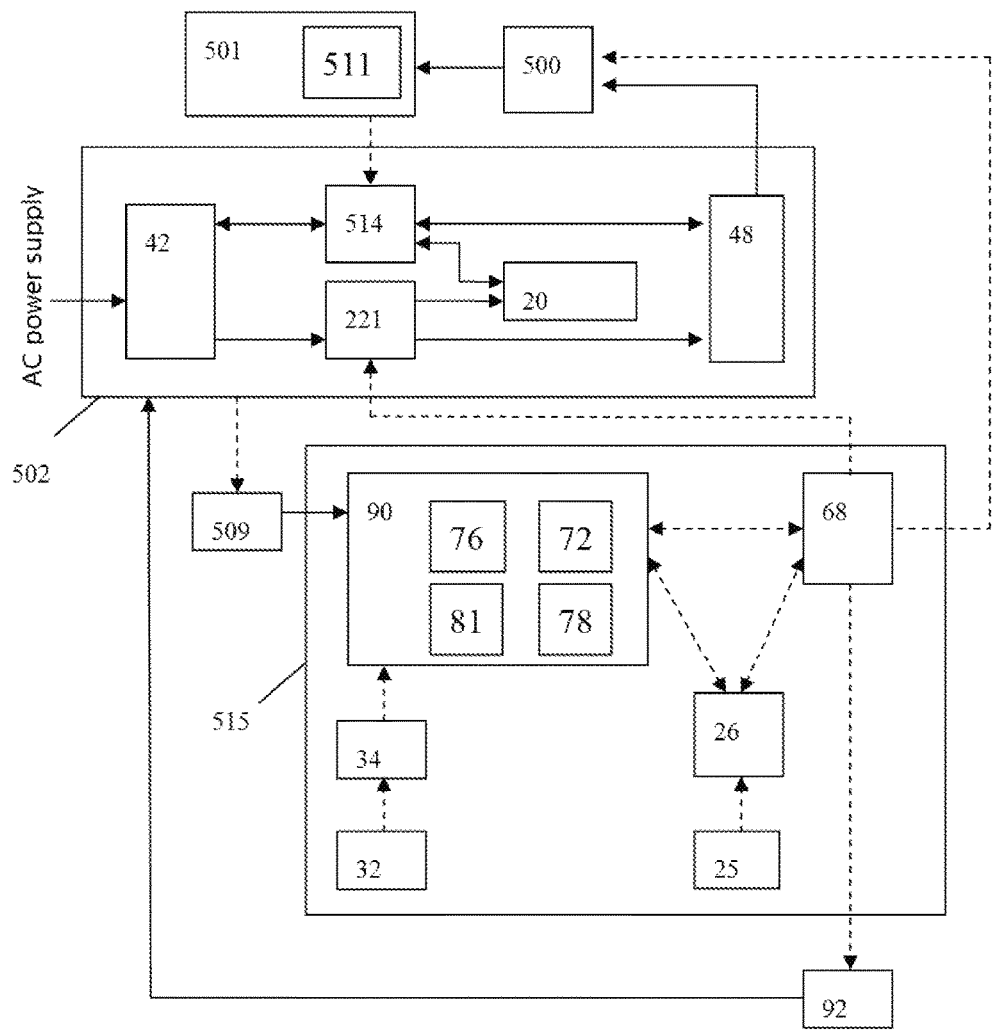
FIG. 2 shows the schematic diagram according to an embodiment of the present invention.

FIG. 2 is the schematic diagram according to an embodiment of the present invention, and shows the control relations of functional units of the circuit protection device. The circuit protection device comprises an AC power path 502, a tripping and resetting actuator 515, a grounding fault detection drive unit 509, a synchronous unit 501, a test and reset switch 92 and a synchronous control switch 500.

Wherein, the AC power path 502 comprises the power terminals 42, the load terminals 48, the socket terminals 20, a main power switch 221 and a synchronous switch 514. The phase line and the neutral line of AC power supply are introduced from the power terminals 42, and then connected with the load terminals 48 and the socket terminals 20 via the main power switch 221. The main power switch 221 is used to connect or disconnect the electrical path between the power terminals 42, the load terminals 48 and the socket terminals 20. The synchronous switch 514 is used to connect the socket terminals 20 with the load terminals 48 or the power terminals 42. The synchronous switch 514 has two operating positions: a normal closed position and a normal open position. When the synchronous switch 514 is at the normal closed position, the socket terminals 20 are connected with the load terminals 48. When the synchronous switch 514 is at the normal open position, the socket terminals 20 are connected with the power terminals 42.

The tripping and resetting mechanism 515 comprises a latch unit 90, a raiser 68, a reset link 26, a tripping push rod 34, the tripping button 32 and the reset button 25. The latch unit 90 comprises a latch pin 72, a latch armature 78, a latch spring 81 and a tripping coil 76. By changing relative positions between the latch pin 72, the reset link 26, and the raiser 68, the raiser 68 is controlled to move up and down, and the main power switch 221, the synchronous control switch 500 and the test and reset switch 92 are switched on or off. Pressing manually the tripping button 25 can make the reset link 26 to move down. Pressing manually the tripping button 32 can make the tripping push rod 34 to move down, and change the position of the latch pin 72.

The ground fault detection drive unit 509 is used to detect the ground fault current in the AC power supply path 502. When the ground fault current exceeds the preset current value, the ground fault detection drive unit 509 switches on the exciting circuit of the tripping coil 76, the tripping coil 76 is energized with the exciting current. Under the action of magnetic force generated by the tripping coil 76, the latch armature 78 pulls the latch pin 72 to move to the right, and the relative positions between the latch pin 72, the reset link 26 and the raiser 68 are changed.

The test and reset switch 92 is used for testing ground fault protection function of the circuit protection device, when the test and reset switch 92 is switched on, a ground fault current is generated in the AC power source path 502, and the ground fault detection drive unit 509 is tripped to act.

The synchronous unit 501 comprises a synchronous coil 511. The synchronous control switch 500 is used to switch on or off the exciting circuit of the synchronous coil 511. When the synchronous control switch 500 is switched on, the synchronous unit 501 is snapped, so that the synchronous switch 514 can be changed from the normal closed position to the normal open position. When the synchronous control switch 500 is switched off, the synchronous switch 514 can be changed back to the normal closed position.

Figure 3:
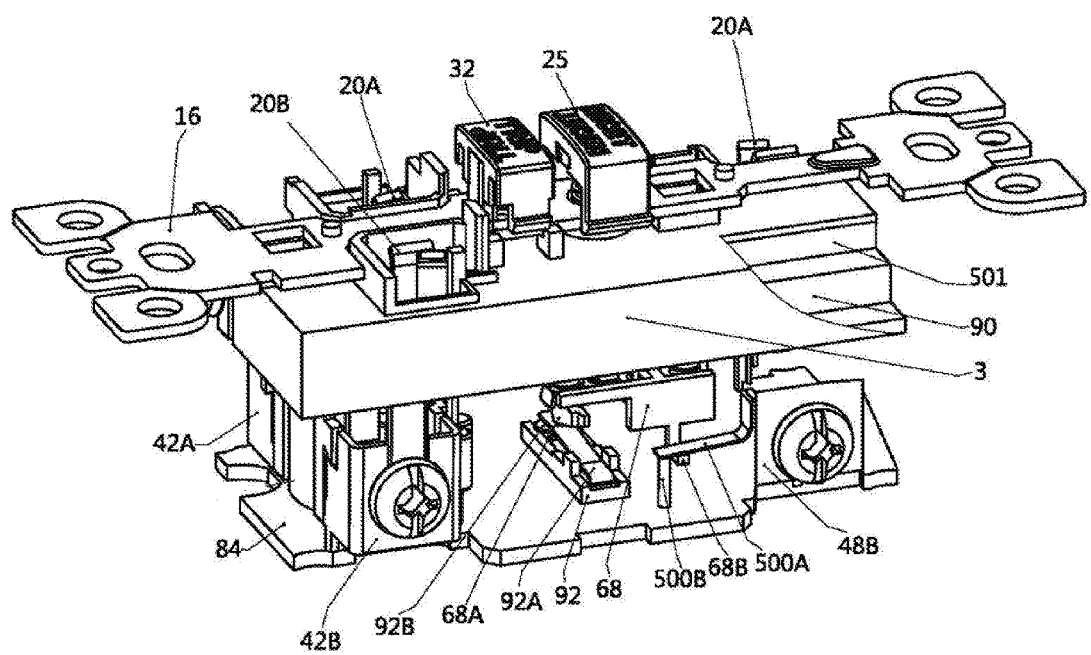
FIG. 3 shows the layout drawing of components according to an embodiment of the present invention.

FIG. 3 shows the layout drawing of components according to an embodiment of the present invention, and shows the major components of the circuit protection device and their position relations. In the housing as described in FIG. 1, there are a clapboard 3, a circuit board 84, a test and reset switch 92 (including a synchronous control movable contact blade 500A and a synchronous control static contact blade 500B), a raiser 68, a latch unit 90, and a synchronous unit 501.

Wherein, the clapboard 3 is fixed between the base 14 and the upper cover 10, the circuit board 84 is fixed on the base 14, the test and reset switch 92 is fixed in the center of the circuit board 84, and the synchronous control switch 500 is fixed at the right front side of the circuit board 84, and the raiser 68 is placed between the circuit board 84 and the clapboard 3. The latch unit 90 is fixed at the right side of the circuit board 84, and the synchronous unit 501 is fixed at the latch unit 90. The components of the ground fault detection drive unit 509 are fixed on the circuit board 84.

Figure 4:
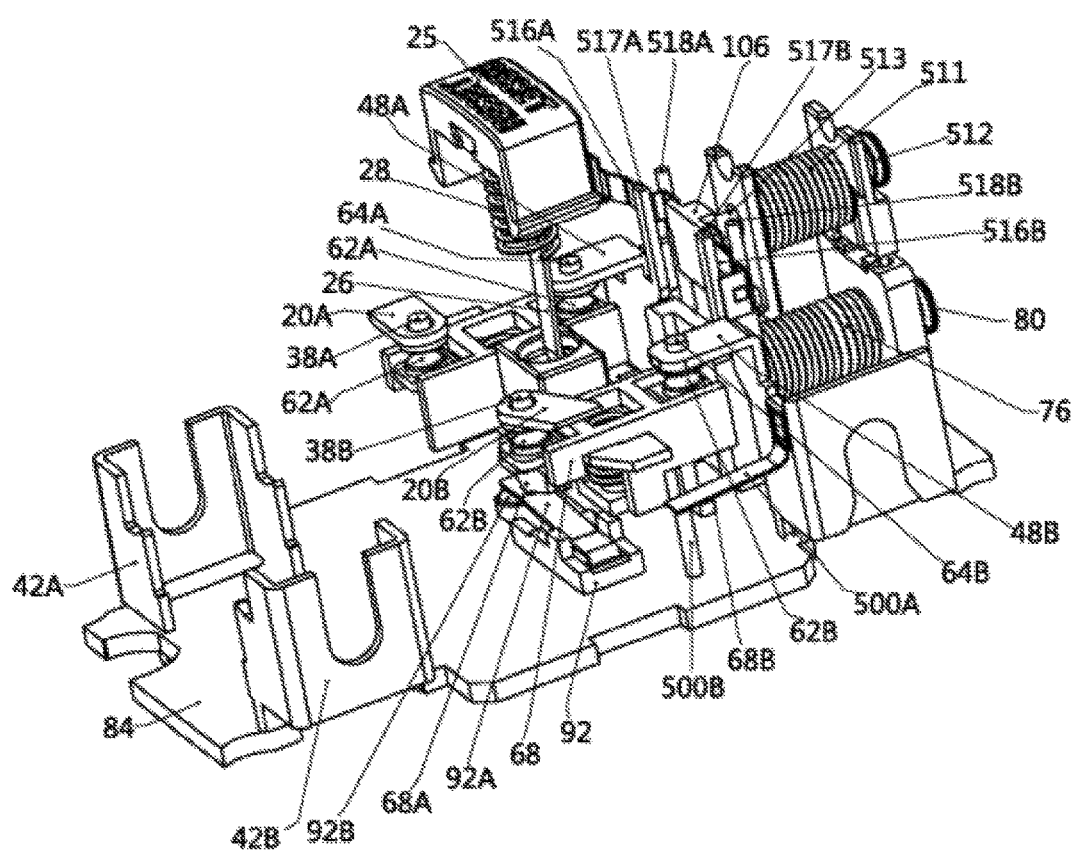
FIG. 4 shows the tripping status diagram according to an embodiment of the present invention.

FIG. 4 shows the tripping status according to an embodiment of the present invention, and shows the switch components in the circuit protection device and their relative positions. Wherein, the main power switch 221 comprises a pair of movable contact blades 62A and 62B, a pair of load static contact blades 64A and 64B, a pair of socket static contact blades 38A and 38B. The power movable contact blades 62A, 62B are fixed on the upper surface of the raiser 68, and the load static contact blades 64A, 64B and the socket static contact blades 38A, 38B are located at the lower surface of the clapboard 3. The power movable contact blades 62A, 62B and the power terminals 42A, 42B are connected, the load static contact blades 64A, 64B are fixed on the load terminals 48A, 48B, and the socket static contact blades 38A, 38B are fixed on the socket terminals 20A, 20B.

The raiser 68 comprises a test bump 68A and a synchronous lifting arm 68B, the test bump 68A is located over the test movable contact blade 92A, and the synchronous lifting arm 68B is located underneath the synchronous control movable contact blade 500A. The raiser 68 moves up and down in direction of perpendicular to the plane of the circuit board 84, and brings together with the power movable contact blades 62A, 62B of the main power switch 221, the test movable contact blade 92A of the test and reset switch 92, the synchronous control movable contact blade 500A of the synchronous control switch 500 to move up and down, and makes the main power switch 221, the test and reset switch 92, the synchronous control switch 500 be switched on or off.

FIGS. 5a to 5f show the latch mechanism drawings according to an embodiment of the present invention, and show the interlocking relations between the reset link 26, the raiser 68 and the latch unit 90 of the circuit protection device. The latch unit 90 comprises a latch pin 72, a latching armature 78, a tripping coil 76 and a latch spring 81. The latch pin 72 has a latch pin slant plate 72A at its left side, a latch hole 72B at its middle, and a latch pin hook 72C at its right side. The latch pin hook 72C is connected with the latch armature 78, and the latch pin 72 moves to right and left together with the latch armature 78 in a horizontal direction. When applying sufficient exciting current to the tripping coil 76, the latch armature 78 moves to right under the action of magnetic force generated by the tripping coil 76 and pulls the latch pin 72 to the right. When the tripping coil 76 is not energized, under the action of elastic force of the latch spring 81, the latch armature 78 pulls the latch pin 72 to the left. The exciting current of the tripping coil 76 is connected with the power terminals 42A and 42B. The latch pin 72 passes through the raiser 68 in a horizontal direction, the latch pin slant plate 72A is at the left side of the raiser 68, the latch hole 72B is in the raiser 68, and the latch pin hook 72C is at the right side of the raiser 68. The latch pin 72 moves together with the raiser 68 in a vertical direction.

The reset link 26 comprises an upper arm 26A, a reset hook 26B and a lower arm 26C from up to down in a vertical direction. The reset link 26 is passed in a vertical direction through a reset spring 28, and then through the clapboard 3, and a tripping spring 30, and then inserted into the raiser 68, and finally inserted into the latch hole 72B. The upper end of the reset spring 28 is pressed onto the bottom of the reset button 25, the lower end of the reset spring 28 is pressed on the clapboard 3, the upper end of the tripping spring 30 is pressed on the bottom of the clapboard 3, and the lower end of the tripping spring 30 is pressed on the raiser 68. The reset link 26 can move up and down in vertical direction, and can also swing the left and right around the joint of the reset link 26 and the reset button 25.

Figure 5A:
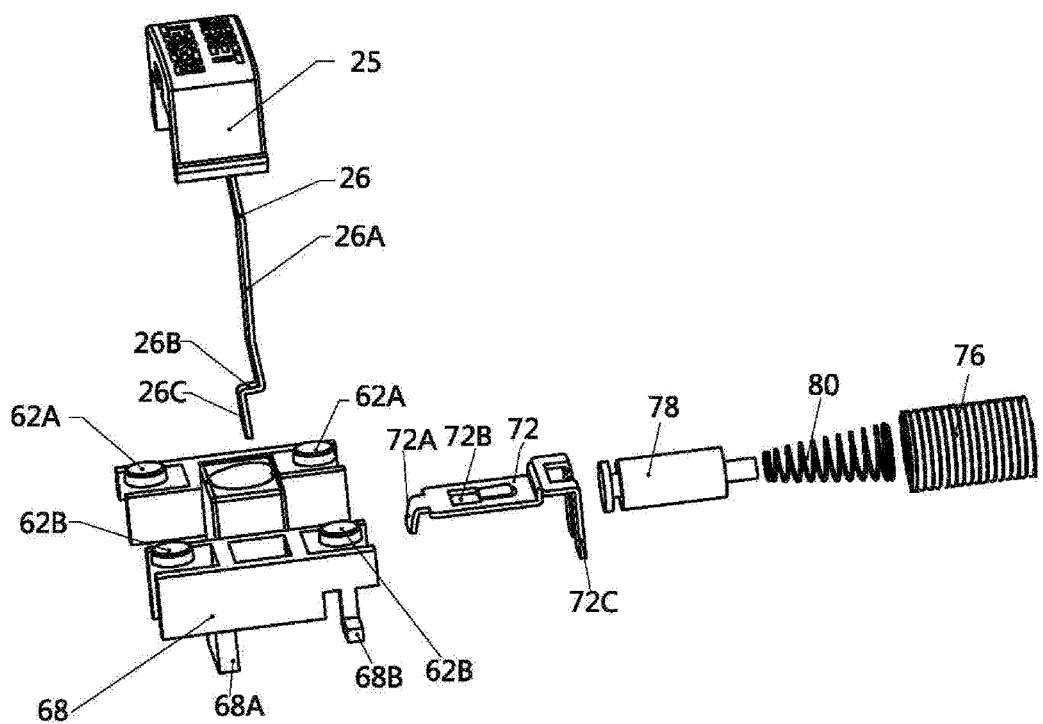
FIGS. 5a to 5f show the latch mechanism drawings according to an embodiment of the present invention.
Figure 5B:
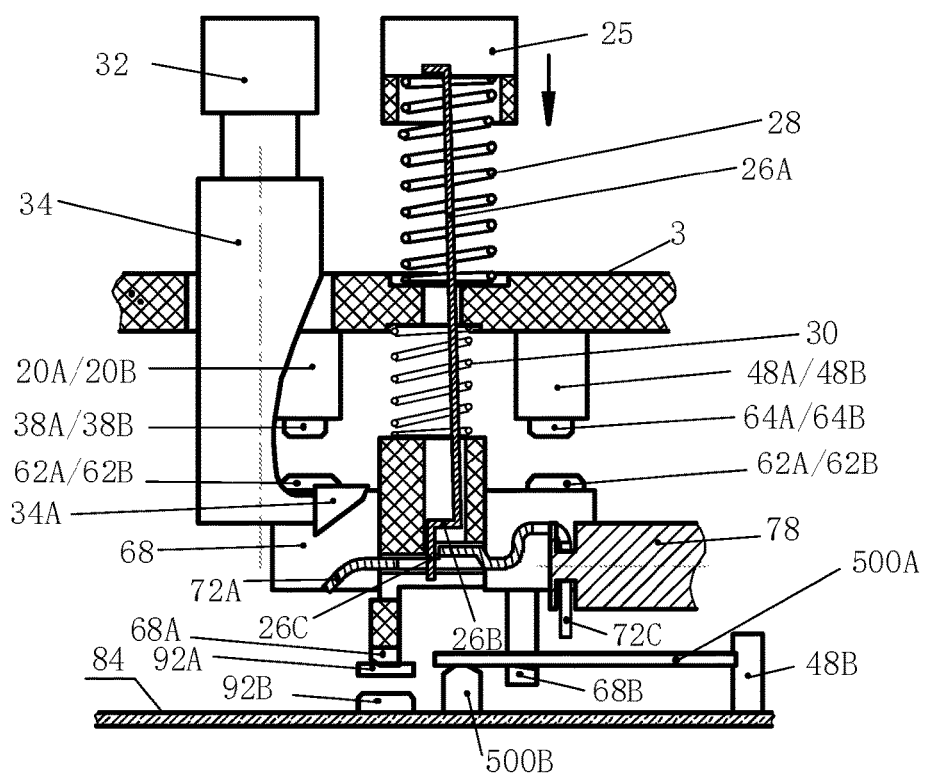
Figure 5C:
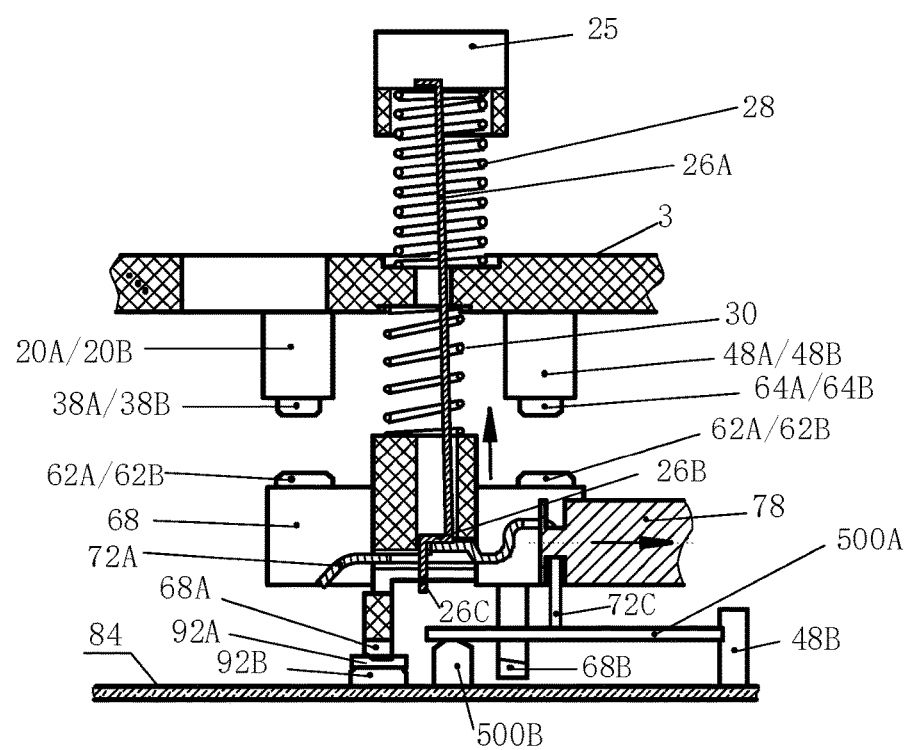

The raiser 68 moves from up to down in a vertical direction and passes through three positions: a reset position (see FIG. 5e), a tripping position (see FIG. 5b) and a test position (see FIG. 5c). When the raiser 68 is located at the reset position, the main power switch 221 is switched on. When the raiser 68 leaves away from the reset position, the main power switch 221 is switched off. When the raiser 68 is located at the test position, the test and reset switch 92 is switched on, and when the raiser 68 leaves away from the test position, the test and reset switch 92 is switched off. When the raiser 68 is located at the test position, or the tripping position, or between the test position and the tripping position, the synchronous control switch 500 is switched on. When the raiser 68 leaves away from the tripping position and moves towards the reset position, the synchronous control switch 500 is switched off before the raiser 68 arrives at the reset position.

The latching function can be realized by changing the relative positions between the latch pin 72, the reset link 26 and the raiser 68. When the latch pin 72 moves to the right, it is unlocked, the latch pin 72 detaches from the raiser 68 and the reset link 26, under the action of the tripping spring 30 and the test movable contact blade 92A, the raiser 68 comes back to the tripping position. When the latch pin 72 moves to the left, there are two locking position according to the relative positions between the reset link 26 and latch pin 72: a lower-locking position and an upper-locking position. The lower-locking position: when the reset hook 26B is located above the latch pin 72, the latch pin 72 pushes the lower arm 26C of the reset link 26 to the left and prevents the reset hook 26B from moving down in a vertical direction (see FIG. 5b). At this time, by pressing manually the reset button 25 to push the reset link 26 downwards, the raiser 68 and latch pin 72 move downwards together with the reset link 26 until the raiser 68 arrives at the test position (see FIG. 5c). The upper-locking position: when the reset hook 26B is located below the latch pin 72 (see FIG. 5d), the latch pin 72 pushes the upper arm 26A of the reset link 26 to left, and makes the reset link 26 swing to the left, so that the reset hook 26B hooks at the bottom of the raiser 68. Under the action of the reset spring 28, the reset link 26 pulls the raiser 68 and the latch pin 72 upwards, until the raiser 68 arrives at the reset position (see FIG. 5e).

The circuit protection device is reset electrically, and during the reset process, the protection function test of the circuit protection device is performed. During the process, the raiser 68 moves down from the tripping position to the test position, and then moves up from the test position to the tripping position, and then moves up from the tripping position to the reset position. During the above process, the reset process can be performed, only when the power terminals 42 of the circuit protection device is connected with AC power source, and the function of the circuit protection device is operated in normal condition. The resetting process is: under the tripping condition, the latch pin 72 is at a lower-locking position, and prevents the reset link 26 from moving down in a vertical direction (see FIG. 5b), the raiser 68 moves down to the test position under the pushing of the reset link 26, and the test bump 68A pushes the test movable contact blade 92A and the test static contact blade 92B of the test and reset switch 92 to close, and makes the test and reset switch 92 switch on (see FIG. 5c), and initiates immediately the protection function test of the circuit protection device. When the protection function of the circuit protection device is normal, the tripping coil 76 is energized with sufficient exciting current. Under the action of magnetic force generated by the tripping coil 76, the latch armature 78 moves to the right and pulls the latch pin 72 to the right, until the latch pin, the reset link and the raiser are in the unlocking position, and the reset link 26 detaches from the raiser 68. The raiser 68 moves up to the tripping position under the action of elastic force of the test movable contact blade 92A, then the test and reset switch 92 is switched off (see FIG. 5d), and the exciting current in the tripping coil 76 goes away. Under the action of elastic force of the latch spring 81, the latch armature 78 pushes the latch pin 72 to the left, and the latch pin 72 pushes the upper arm 26A of the reset link 26 to the left, and the reset hook 26B hooks at the bottom of the raiser 68, and the latch pin 72, reset link 26, and the raiser 68 are at the upper-locking position. Under the action of elastic force of the reset spring 28, the raiser 26 pushes the raiser 68 to move up to the reset position (see FIG. 5e), so that the main power switch 221 is switched on, and the reset process is finished.

Figure 5D:
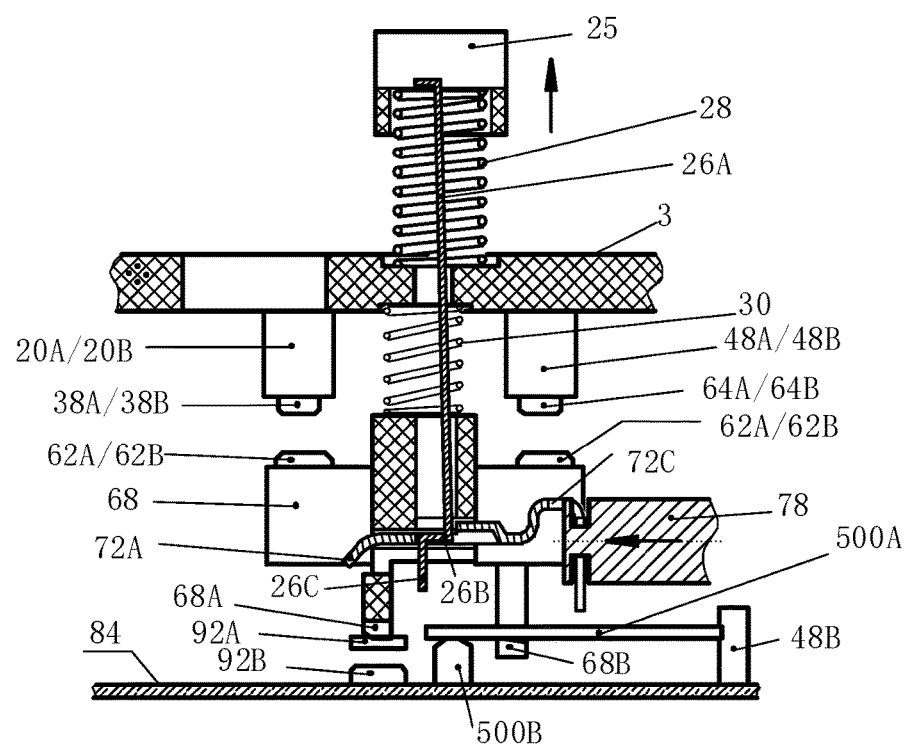
Figure 5E:
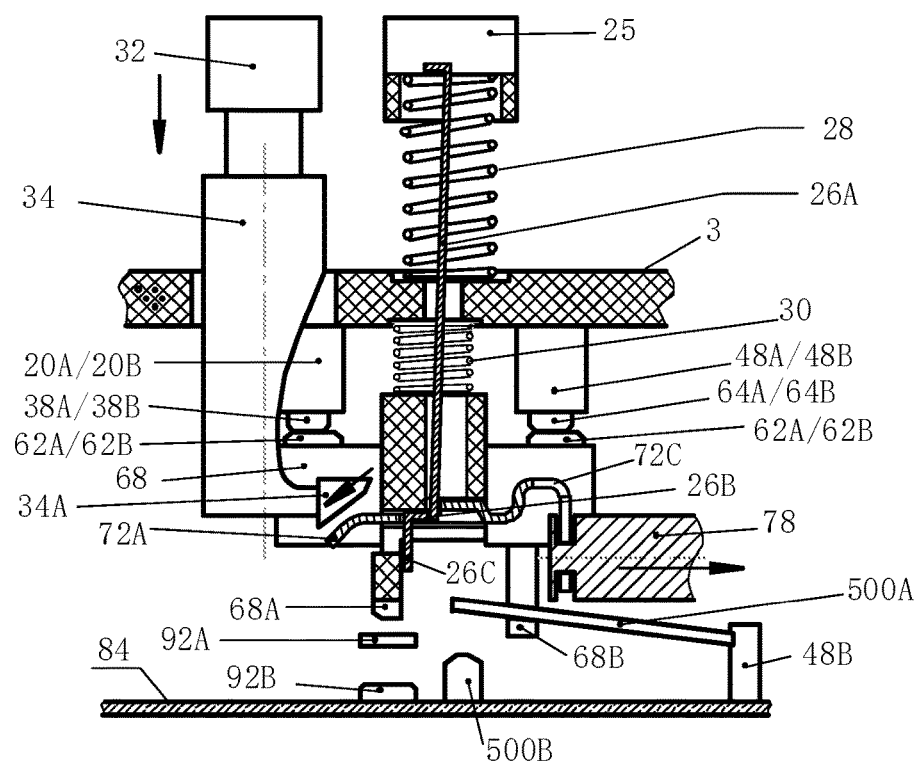
Figure 5F:
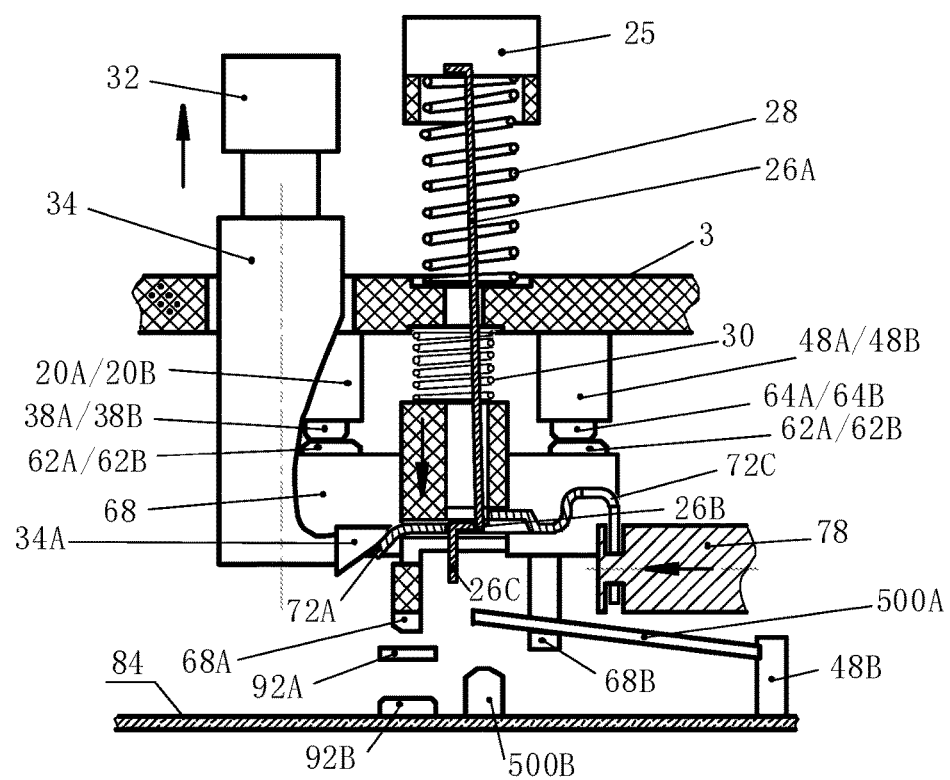

FIGS. 5e, 5f and 5b show the actualizing principle of mechanical tripping function of the circuit protection device. The tripping push rod 34 is located under the tripping button 32 and the tripping ramp 34A is located under the tripping push rod 34. The slant surface of the tripping ramp 34A is located above the latch pin slant plate 72A. When the circuit protection device is at the reset position, the raiser 68 is at the reset position, the latch pin 72 is at the upper-locking position, the slant surface of the latch pin slant plate 72A is close to the slant surface of the tripping ramp 34A (see FIG. 5e). When one pushing manually at the tripping button 32 to push the tripping ramp 34 to move downwards, the slant surface of the tripping ramp 34A and the slant surface of the latch pin slant plate 72A contact with each other, and slide relatively. The tripping ramp 34A pushes the latch pin slant plate 72A to move to the right, unlocks the latch pin 72, and detaches the raiser 68 from the reset link 26 (see FIG. 5f), then the raiser 68 comes back to the tripping position under the action of the tripping spring 30, the latch pin 72 comes back to the left, i.e. the lower-locking position under the action of elastic force of the latch spring 81, realizing the mechanical tripping of the circuit protection device (see FIG. 5b). The process above is a pure mechanical process, so the circuit protection device can be tripped forcibly to interrupt the AC power supply connecting to the load terminals 48 and socket terminals 20, in case that the circuit protection device is not energized or even if the circuit protection device has failed.

Figure 6:
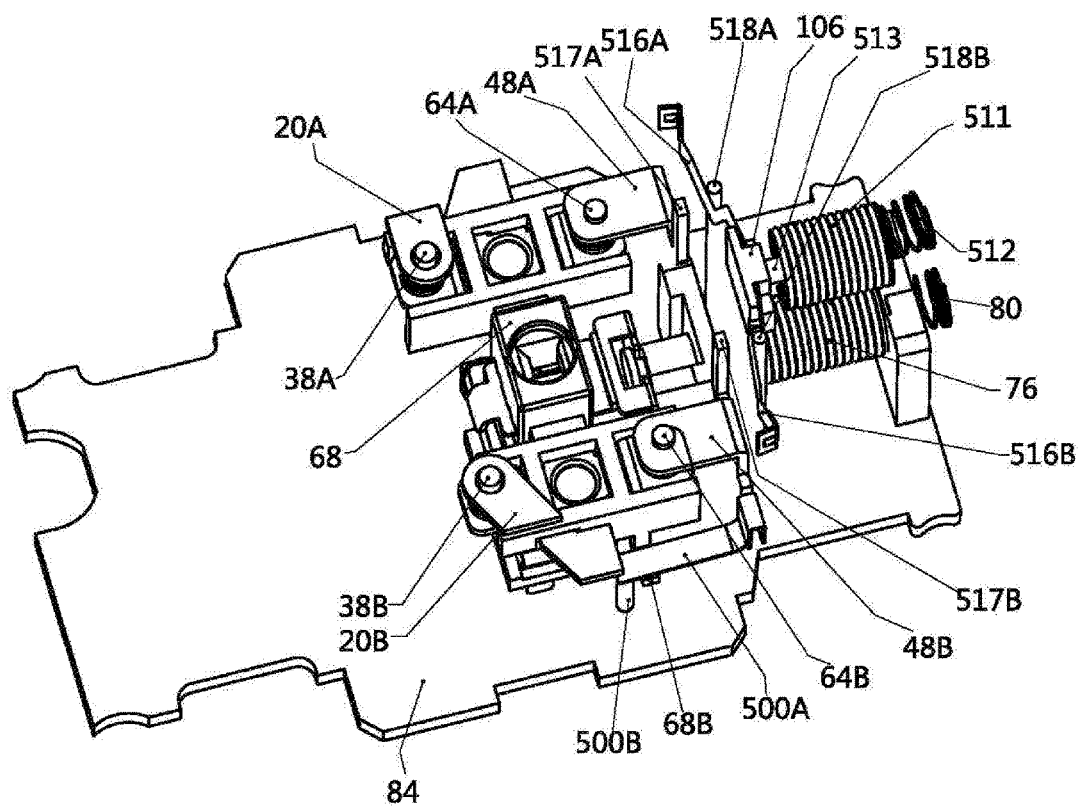
FIG. 6 shows the synchronous structural drawing with reversely wiring according to an embodiment of the present invention.

FIG. 6 shows the synchronous structural drawing with reversely wiring according to an embodiment of the present invention, and shows that the synchronous control switch 500 of the circuit protection device controls the synchronous switch 514 to interrupt the electrical path of AC power supply when the AC power supply is reversely connected with load terminals 48. The synchronous unit 501 comprises a synchronous armature 513, a synchronous pushing plate 106, a synchronous spring 512 and a synchronous coil 511. The synchronous switch 514 comprises a pair of synchronous movable contact blades 516A, 516B, a pair of synchronous normal closed static contact blades 517A, 517B and a pair of synchronous normal open static contact blades 518A, 518B. The synchronous movable contact blades 516A, 516B are fixed on the synchronous pushing plate 106. The synchronous normal closed static contact blades 517A, 517B, the synchronous normal open static contact blades 518A, 518B are fixed on the housing of the synchronous unit 501. The synchronous movable contact blades 516A, 516B are located between the synchronous normal closed static contact blades 517A, 517B and the synchronous normal open static contact blades 518A, 518B. By controlling the release or snapping of the synchronous unit 501, the synchronous control 514 can be at the normal closed position (at this time, the synchronous movable contact blades and the synchronous normal closed static contact blades are closed) or the normal open position (at this time, the synchronous movable contact blades and the synchronous normal open static contact blades are closed).

The synchronous control switch 500 is used for controlling the synchronous unit 501. The synchronous control switch 500 is connected in series with the exciting circuit of the synchronous coil 511, when the synchronous control switch 500 is switched off, the synchronous coil 511 is failed to work, and the synchronous unit 501 releases, and the synchronous switch 514 is at normal closed position. When the synchronous control switch 500 is switched on, and the load terminals 48 are connected with AC power supply, the synchronous coil 511 is energized with exciting current. Under the action of magnetic force generated by the synchronous coil 511, the synchronous armature 513 pulls the synchronous pushing plate 106 to move to right, the synchronous unit 501 is snapped, and the synchronous unit 514 is switched to the normal open position from the normal closed position.

The synchronous movable contact blades 516A and 516B are connected with the socket terminals 20, the synchronous normal closed static contact blades 517A and 517B are connected with the load terminals 48, and the synchronous normal open static contact blades 518A and 518B are connected with the power terminals 42. When the synchronous switch 514 is at the normal closed position, the movable contact blades 516A, 516B and the synchronous normal closed static contact blades 517A, 517B are closed, the socket terminals 20 and the load terminals 48 become one pair of conductors and the power terminals 42 are the other pair of conductors. When the synchronous switch 514 is at the normal open position, the synchronous movable contact blades 516A, 516B and the synchronous normal open static contact blades 518A, 518B are closed, the socket terminals 20 and the power terminals 42 become one pair of conductors and the load terminals 48 are the other pair of conductors.

As described above, under the tripping condition, the synchronous control switch 500 is switched on, when AC power supply is connected reversely with the load terminals 48, the synchronous switch 514 is changed to the normal open condition, and ensures that the socket terminals 20 are not energized.

As shown in FIGS. 5b, 5d, 5e, with AC power supply normally connecting with the power terminals 42, and the circuit protection device being at tripping condition (see FIG. 5b, or FIG. 5d), the synchronous switch 514 is at normal closed position. When the circuit protection device is changed to the reset position from the tripping position, during the reset process, the raiser 68 moves upwards from the tripping position, the synchronous control switch 500 is open by the synchronous lifting arm 68B before the raiser 68 arrives at the reset position (see FIG. 5e), so the synchronous switch 514 is kept at the normal closed position and the load terminals 48 and the socket terminals 20 are connected.

It is to be understood that both the attached drawings and embodiments are intended to provide further explanation of the functions, structures and principles of the present invention as claimed and not limited to the present invention. Also the objects of the present invention have been realized. The above described embodiments may be modified without departing from the spirit or scope of the invention, thus, the present invention cover the scope described in the claims.

The invention claimed is:

1. A circuit protection device, comprising a housing consisting of a base and an upper cover, characterized in that, the circuit protection device, comprises a clapboard, a circuit board, an AC power source path, a synchronous unit, a synchronous control switch, a tripping and resetting mechanism, a ground fault detection drive unit, and a test and reset switch, wherein:

the AC power source path, comprises power terminals, load terminals, socket terminals, a main power switch, and a synchronous switch, wherein: the power terminals are used to input AC power source, the load terminals and the socket terminals are used to connect with loads, the main power switch is used to connect or disconnect to the electrical path between the power terminals and the load terminals and the socket terminals, the synchronous switch is used to connect the socket terminals with the load terminals or the power terminals;

the tripping and reset mechanism, comprises a reset button, a reset link, a tripping button, a tripping push rod, a raiser and a latch unit, wherein, the raiser is fixed between the clapboard and the circuit board, the latch unit comprising a latch pin and a tripping coil, by changing relative positions between the latch pin, the reset link, and the raiser, the raiser is controlled to move up and down, making the main power switch, the synchronous control switch and the test and reset switch switch on or off;

the ground fault detection drive unit, located on the circuit board, detecting a ground fault current in the AC power supply path, and driving the tripping coil, so to change the relative positions between the latch pin, the reset link, and the raiser;

the test and reset switch, used for testing the ground fault protection function of the circuit protection device, when the test and reset switch is switched on, a ground fault current is generated in the AC power source path, and the ground fault detection drive circuit outputs a tripping signal;

the clapboard, fixed between the base and the upper cover, used for fixing socket terminals, and positioning the main power switch and the raiser;

the circuit board, fixed on the base, used for fixing the test and reset switch, the synchronous control switch and the latch unit;

the synchronous control switch, used for controlling the synchronous unit to operate;

the synchronous unit, fixed on the latch unit, used for pulling the synchronous switch to act.

2. The circuit protection device according to claim 1, characterized in that, the test and reset switch comprises a test movable contact blade and a test static contact blade, the synchronous control switch comprises a synchronous control movable contact blade and a synchronous control static contact blade; the main power switch comprises a pair of power movable contact blades, a pair of load static contact blades, a pair of socket static contact blades, the power movable contact blades are installed at the upper surface of the raiser, the load static contact blades and the socket static contact blades are located at the lower surface of the clapboard, the power movable contact blades are connected with the power terminals, the load static contact blades are fixed at the load terminals, the socket static contact blades are fixed on the socket terminals; the raiser comprises a test bump and a synchronous lifting arm, the test bump is located over the test movable contact blade, and the synchronous lifting arm is located under the synchronous control movable contact blade; the raiser moves in a vertical direction and makes the main power switch, the test and reset switch and the synchronous control switch switch on or off, the raiser moves in a vertical direction, and passes through the reset position, the tripping position and the test position from top to bottom; when the raiser is located at the reset position, the main power switch switches on, and when the raiser leaves away from the reset position, the main power switch switches off; when the raiser is located at test position, the test and reset switch switches on, and when the raiser leaves away from the test position, the test and reset switch switches off, when the raiser is located at the test position or the tripping position, or between the test position and the tripping position, the synchronous control switch switches on, and when the raiser leaves away from the tripping position and moves towards the reset position, the synchronous control switch switches off before the raiser arrives at the reset position.

3. The circuit protection device according to claim 2, characterized in that, the latch pin comprises a latch pin slant plate, a latch hole and a latch pin hook, wherein the latch pin moves in a horizontal direction and passes through the raiser, the latch pin slant plate protrudes from the left wall of the raiser, the latch hole is located in the raiser, the latch pin hook is located at the right side of the raiser, and the latch pin can move left and right in a horizontal direction, and move up and down in a vertical direction together with the raiser.

4. The circuit protection device according to claim 3, characterized in that, the reset link comprises an upper arm, a reset hook and a lower arm, the reset link can move up and down in a vertical direction, and can also swing left and right around the joint of the reset link and the reset button, the reset link is inserted into the raiser in a vertical direction, and then inserted into the latch hole; there are three interlock positions among the latch pin, the raiser and the reset link: one is the lower-locking position, the latch pin pushes the lower arm of the reset link to left, and prevents the reset link from moving down in a vertical direction; the second is the upper-locking position, the latch pin pushes the upper arm of the reset link to left, and makes the reset hook swing to left and hook at the bottom of the raiser, and the raiser prevents the reset link from moving upwards; the third is the unlocking position, the latch pin moves to right, and detaches the reset link from the latch pin and the raiser.

5. The circuit protection device according to claim 4, characterized in that, the circuit protection device is reset electrically; during reset process, the raiser pushes the test movable contact blade, and makes the test and reset switch switch on, and the protection function test of the circuit protection device is performed; furthermore, when the power terminals are not connected with AC power source, or when AC power source is reversely connected to the load terminals, or when the protection function of the circuit protection device has failed, the circuit protection device cannot be reset.

6. The circuit protection device according to claim 4, characterized in that, the lower part of the tripping push rod is a tripping ramp; when the tripping button is pushed manually to push the tripping ramp downwards, the slant surface of the tripping ramp and the slant surface of the latch pin slant plate contact with each other, and slide relatively, thus the tripping ramp pushes the latch pin to move to right, and that realizes the mechanical tripping; the circuit protection device can ensure that the mechanical tripping is performed forcibly by means of manual way in case of power failure or even if the circuit protection device has failed.

7. The circuit protection device according to claim 2, characterized in that, the synchronous unit comprises a synchronous armature, a synchronous pushing plate, a synchronous spring and a synchronous coil; the synchronous switch comprises a pair of synchronous movable contact blades, a pair of synchronous normal closed static contact blades and a pair of synchronous normal open static contact blades; the synchronous movable contact blades are fixed on the synchronous pushing plate; the synchronous normal closed static contact blades, the synchronous normal open static contact blades are fixed on the housing of the synchronous unit; the synchronous movable contact blades are located between the synchronous normal closed static contact blades and the synchronous normal open static contact blades; the synchronous control switch is used to switch on or off the exciting circuit of the synchronous coil, and makes the synchronous unit act, so that the synchronous switch can be changeover between the normal open position and the normal closed position; when the synchronous coil is not energized, the synchronous switch is at the normal closed position; when the synchronous coil is energized with a sufficient exciting current, the synchronous switch is switched to the normal open position from the normal closed position.

8. The circuit protection device according to claim 7, characterized in that, the synchronous movable contact blades are connected with the socket terminals, the synchronous normal closed static contact blades are connected with the load terminals, and the synchronous normal open static contact blades are connected with the power terminals; when the synchronous switch is at the normal closed position, the socket terminals are respectively connected with the load terminals, thus the socket terminals and the load terminals become one pair of conductors, and the power terminals are the other pair of conductors; when the synchronous switch is at the normal open position, the socket terminals are respectively connected with the power terminals, thus the socket terminals and the power terminals become one pair of conductors, and the load terminals are the other pair of conductors.

9. The circuit protection device according to claim 8, characterized in that, the exciting circuit of the synchronous coil is connected with the load terminals; under tripping condition, when AC power source is reversely connected with the load terminals, the synchronous switch interrupts the electrical path between the load terminals and the socket terminals, and the socket terminals is thereby de-energized.

10. The circuit protection device according to claim 9, characterized in that, when AC power source is positively connected with the power terminals, and under tripping condition, the synchronous switch is at the normal closed position, during the resetting process of the circuit protection device, the synchronous control switch is interrupted by the raiser, so that the synchronous switch keeps at the normal closed position.

* * * * *